July 8, 1924.
A. M. BRENNE
1,500,102
FRICTION SHOCK ABSORBING MECHANISM
Filed Aug. 7, 1922
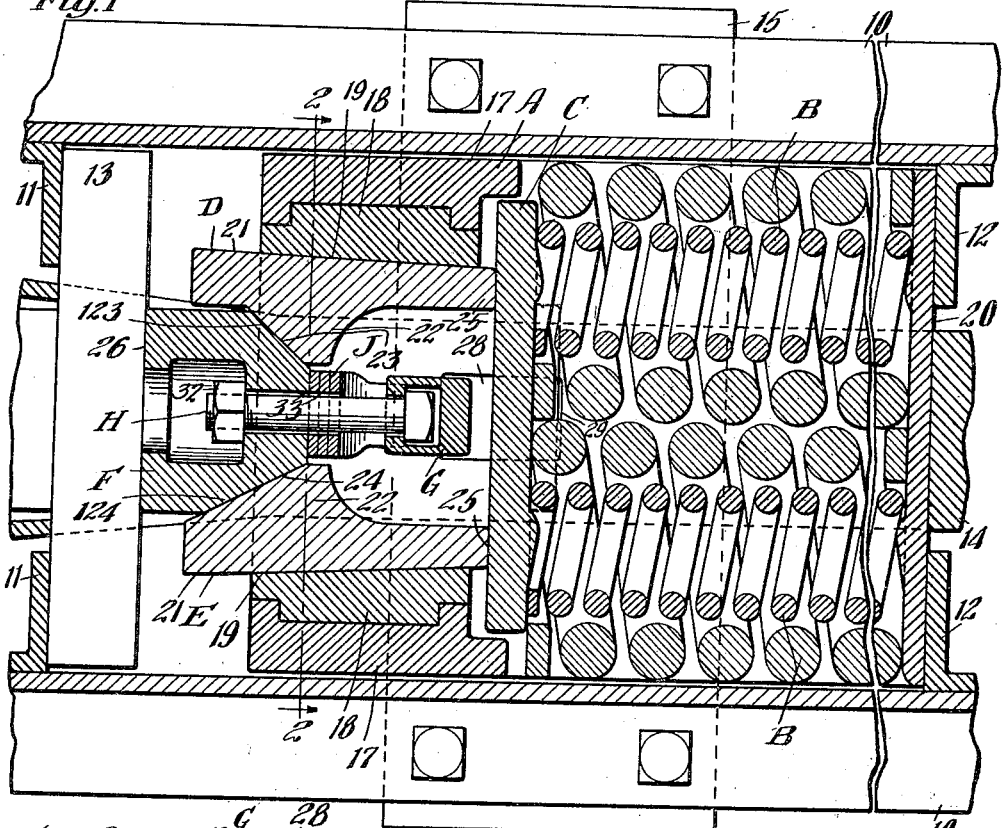
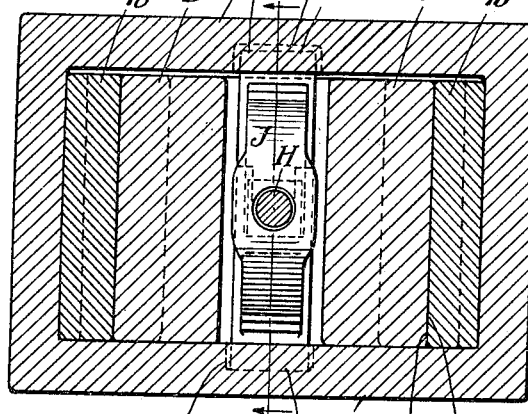
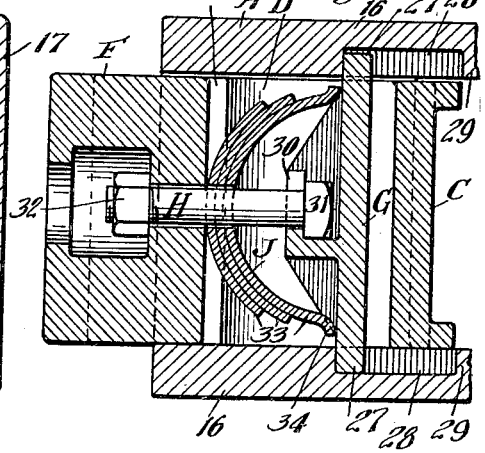
Witnesses
Wm. Geiger
Inventor
Arild M. Brenne
By Geo. I. Haight
His Atty.

Patented July 8, 1924.

1,500,102

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 7, 1922. Serial No. 579,999.

*To all whom it may concern:*

Be it known that I, ARILD M. BRENNE, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide a friction shock absorbing mechanism especially adapted for railway draft riggings, and wherein are obtained high capacity and certain release.

A specific object of the invention is to provide a mechanism of the character indicated, wherein is employed, in addition to the usual main spring resistance, a secondary or auxiliary spring resistance, so arranged as to act in tandem with the main spring resistance for a predetermined portion of a compression stroke, said auxiliary or supplemental spring resistance, in release, operating directly upon the wedging means to facilitate and accelerate disengagement of the wedging means from the friction shoes, and thereby insure collapse of the friction unit.

Other objects of the invention will more clearly appear from the description and claims hereinafter following.

In the drawing forming a part of this specification, Figure 1 is a horizontal longitudinal sectional view, parts being broken away, of a portion of a railway draft rigging showing my improvements in connection therewith. Figure 2 is a vertical transverse sectional view of the shock absorbing mechanism proper corresponding to the section line 2—2 of Figure 1. And Figure 3 is a vertical longitudinal sectional view corresponding to the section line 3—3 of Figure 2.

In said drawing, 10—10 denote the usual channel draft sills of a car underframe, to the inner faces of which are secured front stop lugs 11 and rear stop lugs 12. The shock absorbing mechanism proper, hereinafter described, and a front follower 13 are disposed within a hooded cast yoke 14 which is adapted to be operatively connected with the drawbar in the well-known manner. The yoke and parts therewithin are supported in operative position by a detachable saddle plate 15.

The improved shock absorbing mechanism proper, as shown, comprises, broadly, a combined friction shell and spring cage casting A; twin arranged springs B—B; a spring follower C; a pair of friction shoes D and E; a pressure-transmitting wedge F; a locking bar G; a retainer bolt H; and a supplemental spring J.

The casting A is formed with a friction shell at the front or outer end thereof, said friction shell being defined by top and bottom walls 16—16 and side walls 17—17, as best indicated in Figure 2. The side walls, on their inner sides, have mounted thereon detachable liner blocks 18—18, the inner faces of which provide longitudinally extending friction surfaces 19—19. In actual practice, the friction surfaces 19 will preferably be converged inwardly of the shell. The top and bottom walls 16—16 of the casting A are extended to the rear end thereof, where they are integrally united by a rear wall 20, the latter co-operating with the stop lugs 12 in the manner of the usual rear follower. The side walls 17 of the casting A are made comparatively short so as to leave the major portion of the side of the casting A open to thereby permit of the insertion and removal of the springs B and follower C.

The two friction shoes D and E are of generally similar construction, except as hereinafter pointed out, each of said shoes being formed on the outer side thereof with a longitudinally extending friction surface 21 adapted to cooperate with the corresponding shell friction surface 19. On its inner side, each shoe D and E is formed with an inwardly extended enlargement 22, the enlargement 22 on the shoe D having an inclined face 23 which extends rearwardly and toward the axis of the mechanism at a relatively blunt, non-wedge-acting releasing angle with respect to forces applied parallel or substantially parallel to the axis of the mechanism. The enlargement 22 of the shoe E is formed with an inclined face 24 which extends rearwardly and toward the axis of the mechanism at a relatively acute or keen, true wedging angle with respect to forces applied parallel or substantially parallel to the axis of the mechanism. The inner ends 25—25 of the shoes D and E are extended inwardly beyond the inner edge of the liners 18—18, where the same bear upon the front side of the spring follower C, which is sufficiently extended laterally to provide a bearing on its rear side for the twin arranged springs B.

The pressure-transmitting wedge F is preferably in the form of a casting having an outer transverse bearing face 26 engaging the inner side of the front follower 13. Said wedge F is formed on one side thereof with an inclined face 124 engaging and cooperating with the wedge face 24 of the shoe E. On its opposite side, the wedge F is arranged with another inclined face 123 engaging and cooperating with the inclined face 23 of the shoe D. The arrangement of the sets of faces 23 and 123 and 24 and 124, respectively, is such that as an actuating force is applied parallel or substantially parallel to the center line of the mechanism the effective wedging action will take place on the two faces, 24 and 124, without any substantial or appreciable wedging action on the faces 23 and 123 except in so far as there is an equal reaction laterally or transversely of the shell. Upon removal of the actuating force, the faces 23 and 123 will be of sufficient bluntness as to insure collapse of the friction unit on said faces, even though the faces 24 and 124 extend at such an angle that they might otherwise cause sticking or jamming of the parts, all as more fully described in the pending application of John F. O'Connor for friction shock absorbing mechanism Serial No. 389,800 filed June 18, 1920, and assigned to William H. Miner.

The locking or anchor bar G extends vertically within the shell, as shown in the drawing, the top and bottom ends 27—27 of said bar working in longitudinally arranged slots 28—28 formed on the inner sides of the top and bottom walls 16 of the casting A. The length of said slots 28 and the thickness of the anchor bar G are so related that the anchor bar G is allowed a longitudinal movement within the slots 28 less than the permissible compression stroke of the mechanism, and in actual practice, if the mechanism is intended to have a travel of 2¾ inches, the anchor bar G will preferably be allowed a movement of only 2¼ inches, so that during the last ½ inch of a full compression stroke of the mechanism the anchor bar G will remain stationary, inasmuch as it will bear against the shoulders 29—29 at the inner ends of the slots 28, for the purpose hereinafter described.

On its front or forward side the anchor bar G is formed with a slotted over-hanging flange 30 beneath which is engaged the head 31 of the retainer bolt H, the latter extending through suitable perforations in the spring resistance J and through an opening in the wedge F and anchored at its forward end by the nut 32 within a suitable recess formed in the wedge F.

The auxiliary or supplemental spring resistance J, as shown, preferably consists of a series of curved spring plates 33—33 arranged on top of each other, as best shown in Figure 3. Said spring plates 33 are graduated in length, the longest one being placed innermost and having its ends 34 bearing upon the front side of the anchor bar G. The high point of the built-up spring J bears on the inner end of the wedge F. Said spring resistance J will be placed under an initial compression so as to normally maintain the wedge F, spring resistance J and locking bar G taut. It will be noted also that the bolt H being limited in its outward movement with respect to the casting A, serves to hold the parts in assembled relation.

The operation is as follows, assuming a compression stroke of the mechanism. The friction shoes and wedge, as a unit, will be yieldingly resisted in their movement inwardly relatively to the friction shell by the main spring resistance comprising the springs B—B thru the spring follower C. During the initial portion of the compression stroke, and for preferably 2¼ inches, the auxiliary spring J and anchor bar G will move in unison with the wedge F. When, however, the locking bar G is limited against further movement inwardly of the friction shell, it is evident that the wedge F will be directly yieldingly resisted by the auxiliary or supplemental spring J, the latter being further flexed as the wedge F approaches the anchor bar G. During the latter portion of the compression stroke, it is evident that the auxiliary spring J acts in tandem with relation to the main spring resistance, the latter coacting in a direct manner with the friction shoes and the supplemental spring in a direct manner with the wedge F. Upon removal of the actuating force, the collapse of the friction unit is greatly facilitated and accelerated by reason of the auxiliary spring J, which will immediately return to its normal condition, thereby forcing the wedge F outwardly independent of any similar movement of the friction shoes D and E which may be induced by the expansion of the main spring resistance.

From the preceding description, considered in connection with the drawing, it will be observed that the introduction of the auxiliary spring J does not in anywise interfere with the other parts of the mechanism, nor does it require the reduction in size of the friction shoes or wedge so that the additional capacity obtained by the use of the spring resistance J and the beneficial effect resulting during the release action are obtained without any appreciable increased expense and without militating against the effectiveness of the other parts of the mechanism.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell; of friction shoes cooperable therewith; pressure-transmitting wedging means cooperating with the shoes; a main spring resistance operative to yieldingly resist relative movement between the shoes and shell; a supplemental spring resistance; and means operative after a predetermined movement of the mechanism arranged to render said supplemental spring resistance effective in tandem with the main spring resistance during a compression stroke.

2. In a friction shock absorbing mechanism, the combination with a friction shell; of friction shoes cooperable therewith; pressure-transmitting wedging means cooperating with the shoes; a main spring resistance operative to yieldingly resist relative movement between the shoes and shell; a supplemental spring resistance, said supplemental spring resistance cooperating directly with said wedging means; and means, operative during a part only of a compression stroke, for rendering said supplemental spring resistance operative to resist movement of said wedging means independent of the main spring resistance.

3. In a friction shock absorbing mechanism, the combination with a friction shell; of friction shoes cooperable therewith; a wedge cooperable with the shoes; a main spring resistance; a supplemental spring resistance; a member movable with the wedge and between which and the wedge said supplemental spring resistance is interposed; and means limiting the movement of said member to less than the total possible travel of the wedge, whereby said supplemental spring resistance is operative to directly resist continued travel of the wedge when said member is held against movement relatively to the shell.

4. In a friction shock absorbing mechanism, the combination with a friction shell; of friction shoes cooperable therewith; a wedge cooperable with the shoes; a main spring resistance; a main spring follower interposed between said main spring resistance and the friction shoes; a supplemental spring; a member movable with the wedge and between which and the wedge said supplemental spring resistance is interposed; and means limiting the travel of said member to less than that of the total possible travel of the wedge.

5. In a friction shock absorbing mechanism, the combination with a friction shell; of friction shoes cooperable therewith; a wedge cooperable with the shoes; a main spring resistance; a supplemental spring resistance; a member movable with the wedge and between which and the wedge said supplemental spring resistance is interposed; means limiting the movement of said member to less than the total possible travel of the wedge, whereby said supplemental spring resistance is operative to directly resist continued travel of the wedge when said member is held against movement relatively to the shell; and a connecting bolt between said member and said wedge.

6. In a friction shock absorbing mechanism, the combination with a friction shell having interior opposed longitudinally extending friction surfaces; of opposed friction shoes cooperable with said shell and friction surfaces; a wedge cooperable with said friction shoes; a main spring resistance; a spring follower interposed between said spring resistance and the adjacent ends of the friction shoes; a locking bar movable longitudinally with respect to the shell for a distance less than the total compression stroke of the mechanism; a supplemental spring resistance interposed between said locking bar and the adjacent inner end of the wedge; and means connecting said locking bar with the wedge.

In witness that I claim the foregoing I have hereunto subscribed my name this 22nd day of July, 1922.

ARILD M. BRENNE.

Witnesses:
UNA C. GRIGSBY,
ANN BAKER.